(12) United States Patent
Padden et al.

(10) Patent No.: US 10,584,579 B2
(45) Date of Patent: *Mar. 10, 2020

(54) FLOW MEASURING SYSTEM TO MEASURE FLUID FLOW IN A SUBSEA MARINE RISER SYSTEM

(71) Applicants: Ian Padden, Sacramento, CA (US); Tom Stockton, Penn Valley, CA (US)

(72) Inventors: Ian Padden, Sacramento, CA (US); Tom Stockton, Penn Valley, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/104,689

(22) Filed: Aug. 17, 2018

(65) Prior Publication Data

US 2018/0355711 A1   Dec. 13, 2018

Related U.S. Application Data

(63) Continuation-in-part of application No. PCT/US2016/069529, filed on Dec. 30, 2016, which is a continuation of application No. 15/047,313, filed on Feb. 18, 2016, now Pat. No. 9,546,891.

(51) Int. Cl.
| | |
|---|---|
| *G01F 1/10* | (2006.01) |
| *E21B 47/10* | (2012.01) |
| *G01F 1/20* | (2006.01) |
| *G01F 5/00* | (2006.01) |
| *G01P 13/04* | (2006.01) |

(52) U.S. Cl.
CPC .............. *E21B 47/10* (2013.01); *G01F 1/10* (2013.01); *G01F 1/20* (2013.01); *G01F 5/00* (2013.01); *G01P 13/045* (2013.01)

(58) Field of Classification Search
None
See application file for complete search history.

(56) References Cited

U.S. PATENT DOCUMENTS

| | | |
|---|---|---|
| 3,811,322 A | 5/1974 | Swenson |
| 4,454,758 A | 6/1984 | Miller |
| 5,168,932 A | 12/1992 | Worrall |
| 5,333,496 A | 8/1994 | Fenelon |
| 5,811,688 A * | 9/1998 | Marsh ...................... E03F 7/00 73/227 |
| 6,257,354 B1 | 7/2001 | Schrader |
| 6,397,686 B1 * | 6/2002 | Taivalkoski ............. B67D 7/20 73/861.78 |

(Continued)

*Primary Examiner* — Harshad R Patel
(74) *Attorney, Agent, or Firm* — Steven A. Nielsen; www.NielsenPatents.com

(57) ABSTRACT

A flow measuring system detects fluid flow in a subsea well. A disclosed flow measuring system may comprise a housing 12 attached over a hole 22 or riser aperture, defined within a riser 20, creating a fluid pathway. Continuous louvers 27 may span the riser aperture, filtering the flow of fluid reaching the fluid pathway. The direction and volume of flow within the fluid pathway may be measured by sensors attached to the housing. In an alternative embodiment, director plates 29 may be integrated with or integral to the louvers with the director plates influencing the flow of fluid to, within and out of the fluid pathway. The use of flow measurement sensors within the fluid pathway is also disclosed. In one embodiment, no louvers or director plates are used, thus increasing the fluid communication between the riser and housing.

11 Claims, 7 Drawing Sheets

(56) References Cited

U.S. PATENT DOCUMENTS

| | | |
|---|---|---|
| 6,655,207 B1 | 12/2003 | Speldrich |
| RE39,843 E * | 9/2007 | Wineland ............... G01D 11/30 |
| | | 324/160 |
| 9,546,891 B1 * | 1/2017 | Padden ..................... G01F 1/10 |
| 2012/0096920 A1 * | 4/2012 | Martinez ................. G01F 1/115 |
| | | 73/1.28 |
| 2016/0061640 A1 * | 3/2016 | Joshi ......................... G01F 1/00 |
| | | 73/197 |

* cited by examiner

FLOW MEASURING SYSTEM TO MEASURE FLUID FLOW IN A SUBSEA MARINE RISER SYSTEM

RELATED PATENT APPLICATIONS AND INCORPORATION BY REFERENCE

This utility patent application is a Continuation in Part (CIP) of and/or a 371 application of, and claims priory to PCT/US16/69529 filed on or about Dec. 30, 2016 which claims priority to U.S. patent application Ser. No. 15/047,313 filed on or about Feb. 18, 2016, which is now U.S. Pat. No. 9,546,891 issued on or about Jan. 17, 2017. These related patent applications are incorporated herein by reference and made a part of this application. If any conflict arises between the disclosure of the invention in this utility application and that in the related patent applications, the disclosure in this utility application shall govern. Moreover, the inventor(s) incorporate herein by reference any and all patents, patent applications, and other documents hard copy or electronic, cited or referred to in this application and/or the related patent applications.

BACKGROUND

The disclosed embodiments relate generally to systems that measure flow in a subsea marine riser system.

DESCRIPTION OF THE RELATED ART

In the prior art, real-time accurate and positive measurement of the flow of fluids in the annulus of a wellbore, or the wellbore itself, during operations on a floating drilling or production vessel was done relative to the well bore. Some endeavors in this field include: U.S. Pat. No. 3,811,322 issued to Swenson; U.S. Pat. No. 6,257,354 issued to Schrader; and U.S. Pat. No. 5,168,932 issued to Worrall. However, Swenson, Schrader and Worrell do not teach using a propeller in a parallel flow portion of a tube to determine flow rate. Embodiments of the disclosed invention solve this problem and other shortfalls in the prior art.

The known prior art also fails to anticipate, suggest or make obvious the use of a void in a riser and a housing attached to a riser with sensors attached to the housing used to determine the flow rate and direction flow within the housing. The prior art teaches away from this embodiment by disclosing various bypass systems.

SUMMARY

The presently disclosed embodiments include a flow measuring system is adapted to measure flow in a subsea marine riser or in other applications where flow rate and flow direction need to be measured. Disclosed embodiments may include a housing, attached over an aperture or hole in a riser creating a fluid pathway there between. A deflector plate may be attached to the riser and covering some of the aperture or hole defined within the riser. Upper vertical louvers and lower vertical louvers may be directly attached to the deflector plate over the riser hole. Spaces between the upper vertical louvers and the lower vertical louvers permit fluid to flow through. A flow measurement device may be mechanically coupled to the housing and the deflector plate and configured to determine the speed and direction of flow through the housing fluid pathway.

Disclosed embodiments may include continuous louvers with director plates between louvers. Louvers may span the entire length of a riser aperture. Director plates may be used to assist in directing fluid into and out of a module, with the director plates disposed between the louvers at the upper and lower portion of the louvers. Disclosed embodiments may include a single director plate at each end of the louvers or a plurality of director plates.

Disclosed embodiments may include continuous louvers that may span the entire length of a riser aperture with no director plates.

Disclosed embodiments may include continuous louvers with flow measurement sensors external to the chamber.

In some embodiments, a mounting bracket can be attached to the housing and the deflector plate. A propeller can be attached to the mounting bracket. A plurality of sensors can be attached to the housing and the deflector plate. Sensor cables can be attached to the plurality of sensors and a processor. The plurality of sensors monitor the speed and direction of flow through the fluid pathway which is communicated to the processor.

In some embodiments, a first mounting bracket can be attached to the housing and the deflector plate. A second mounting bracket can be attached to the housing and the deflector plate. A rotating shaft is attached to the first mounting bracket and the second mounting bracket. Helical blades are attached to the rotating shaft. A plurality of sensors can be attached to the housing and the deflector plate. Sensor cables can be attached to the plurality of sensors and a processor. The plurality of sensors may monitor the speed and direction of flow through the fluid pathway which is communicated to the processor.

In some embodiments, an upper flow plate can be directly attached to the housing with a first hinge. A deflector ramp can be attached to the deflector plate. A lower flow plate can be attached to the deflector ramp with a second hinge. A plurality of sensors can be attached to the first hinge and the second hinge. Sensor cables can be attached to the plurality of sensors and a processor. The plurality of sensors can monitor the speed and direction of flow through the fluid pathway which is communicated to the processor.

In some embodiments, a housing may be attached over a void in the riser and the embodiment may be devoid of any louver, direction plate, deflector plate or other elements covering the riser void. A sensor may be attached to the housing. This configuration has been found to provide unexpectedly good results in the detection of flow rate and flow direction. The prior art, such as Miller, Speldrich and Fenelon all teach the use of elements or deflectors within the middle portions of the main pipe to either prevent flow within the bypass channel or to alter the flow within the main pipe. A disclosed embodiment shown at FIGS. 13 and 14 eschews the teachings of the prior art and allows for direct flow from a riser void into the attached housing, with the attached housing having unfettered fluid communication with the riser via the riser void. Testing of this system has delivered unexpectedly accurate results in detecting the rate and direction of flow through the housing. Measurements of flow within the housing have been found to be very close to the flow of the riser. Moreover, the lack of a louver or other obstruction in the riser void allows for a smoother riser bore, assisting in increasing the flow rate within the riser.

BRIEF DESCRIPTION OF THE FIGURES

The detailed description of some embodiments of the invention is made below with reference to the accompanying figures, wherein like numerals represent corresponding parts of the figures.

Figure 1:
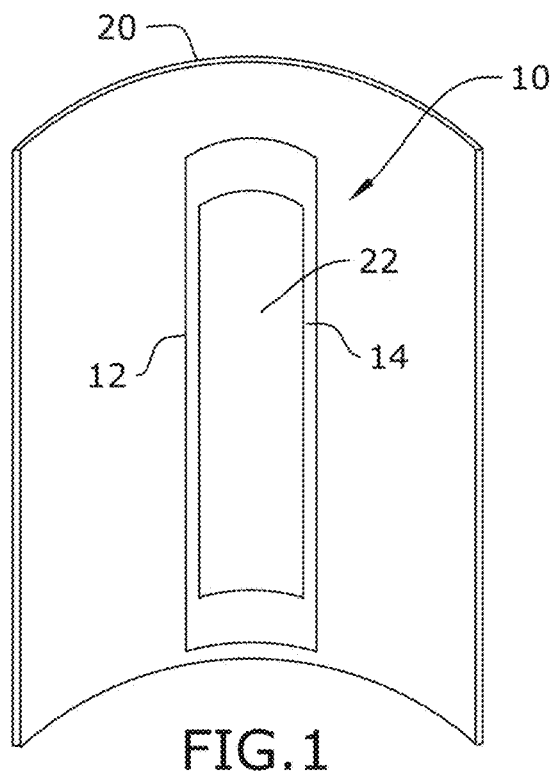
FIG. 1 shows a schematic view of one embodiment of the present invention.

REFERENCE NUMBERS IN THE DRAWINGS 10 flow measuring system
12 housing
14 housing inner edge
16 flange welded on riser
18 fasteners
20 riser
22 hole or aperture defined within the side of the riser
24 deflector plate
26 upper vertical louvers
27 continuous louvers
28 lower vertical louvers
29 director plates
30 spaces between louvers
32 mounting bracket
34 propeller
36 fluid
38 ocean surface
40 seafloor
44 sensor (proximity)
45 sensor (ultrasonic)
46 sensor cable
110 second disclosed flow measuring system
112 second disclosed housing
120 second disclosed riser
122 second disclosed hole or aperture in the side of the riser
124 second disclosed deflector plate
126 second disclosed upper vertical louvers
128 second disclosed lower vertical louvers
132 disclosed upper mounting bracket
133 disclosed lower mounting bracket
134 rotating shaft
136 helical blades attached to rotating shaft
210 third disclosed embodiment
212 third disclosed housing
220 third disclosed riser
222 third disclosed hole or aperture in the side of the riser
224 third disclosed deflector plate
226 third disclosed upper vertical louvers
228 third disclosed lower vertical louvers
246 upper hinge
248 upper flow plate
250 deflector ramp
252 lower flow plate
254 lower hinge

DETAILED DESCRIPTION OF CERTAIN EMBODIMENTS

Figure 2:
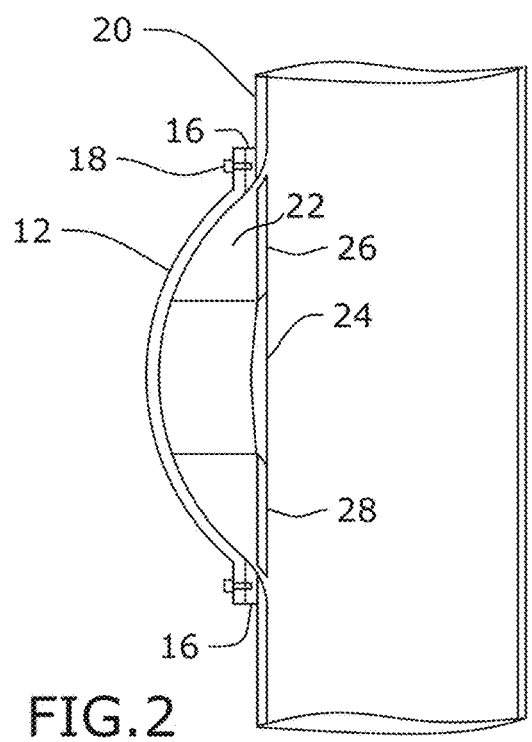
FIG. 2 shows a schematic view of one embodiment of the present invention.

By way of example, and referring to FIG. 1 and FIG. 2, flow measuring system 10 is attached to riser 20. Flow measuring system 10 further comprises housing 12 further comprising housing edge 14. Housing edge 14 is immediately adjacent to flange 16. A plurality of fasteners 18 are inserted through housing edge 14 and screw into flange 16.

Figure 3:
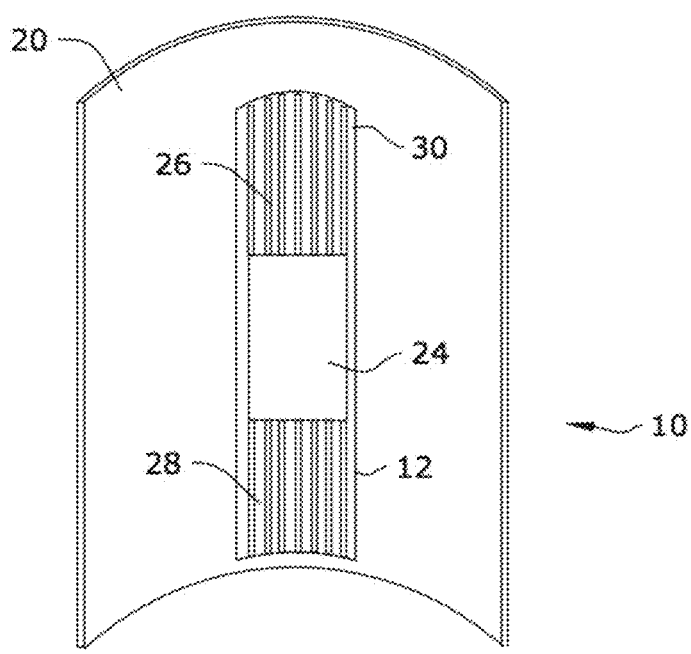
FIG. 3 shows a schematic view of one embodiment of the present invention.

Turning to FIG. 2, riser 20 further comprises hole or aperture 22. Riser 20 is mechanically coupled to deflector plate 24 which covers some of hole 22 with a fluid pathway therebetween. As shown in FIG. 3, deflector plate 24 is directly attached to upper vertical louvers 26 and lower vertical louvers 28. Spaces 30 exist between the upper vertical louvers 26 and the lower vertical louvers 28.

Figure 4:
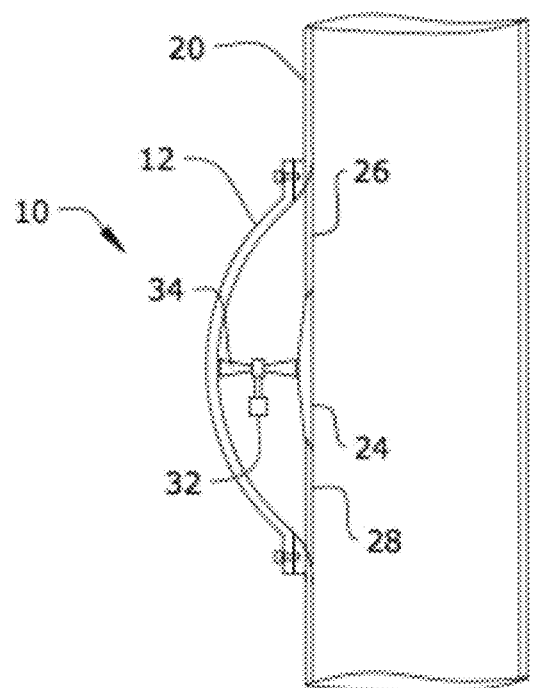
FIG. 4 shows a schematic view of one embodiment of the present invention.
Figure 5:
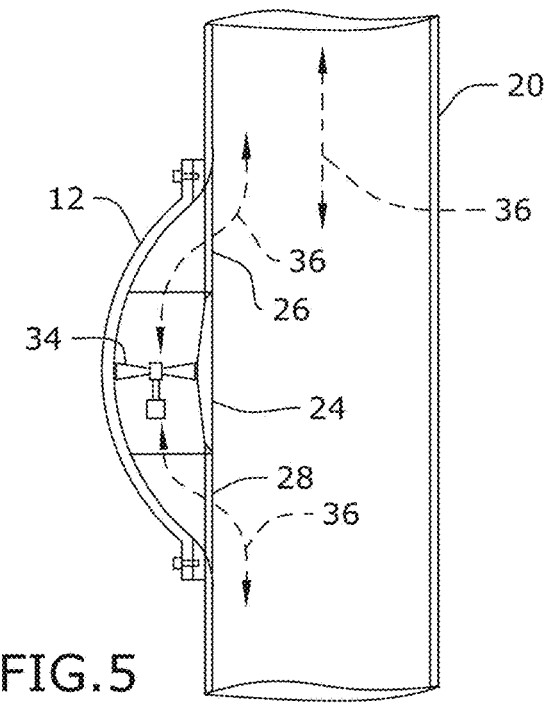
FIG. 5 shows a schematic view of one embodiment of the present invention.
Figure 6:
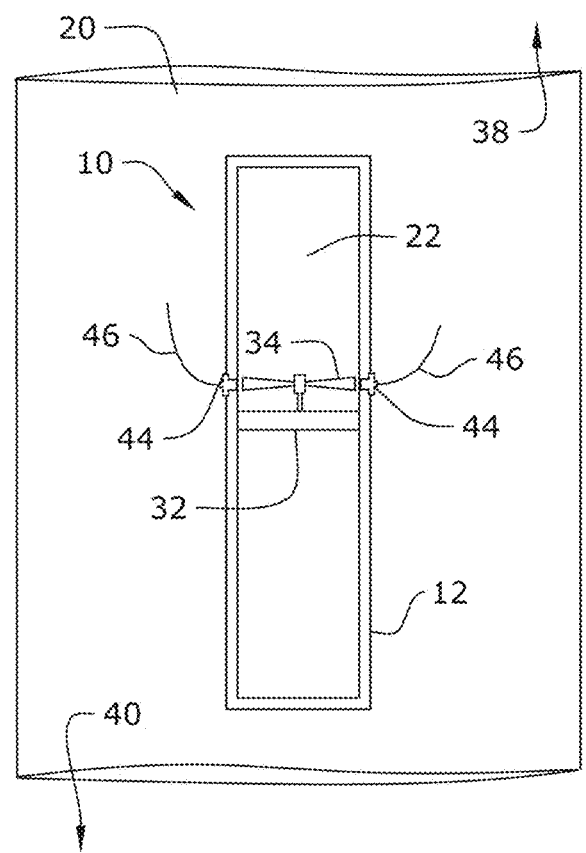
FIG. 6 shows a schematic view of one embodiment of the present invention.

FIG. 4 shows an example of a flow measurement device. Mounting bracket 32 is directly attached to housing 12. Mounting bracket 32 is a narrow bar which does not impede the flow in either direction. Mounting bracket 32 is mechanically coupled to propeller 34. Turning to FIG. 5 and FIG. 6, fluid 36 can flow either upward toward surface 38 or downward toward seafloor 40. Propeller 34 further comprises blades that are arranged in one direction such that downward flow of fluid turns the blade a first direction and upward flow of fluid turns the blades a second direction. In either direction of flow, aperture 22 exists between housing 12 and riser 20 which allows fluid flow.

In FIG. 6, at least one sensor 44 is directly attached to housing 12, two sensors 44 are shown in FIG. 6 and there can be a plurality of sensors. Each sensor 44 is electrically coupled to at least one sensor cable 46 which is further electrically coupled to a processor, most commonly located on surface 38. As propeller 34 turns, each sensor 44 determines the speed at which propeller 34 is turning as well as the direction that propeller 34 is turning. This enables the processor to determine the speed and direction of flow.

Figure 7:
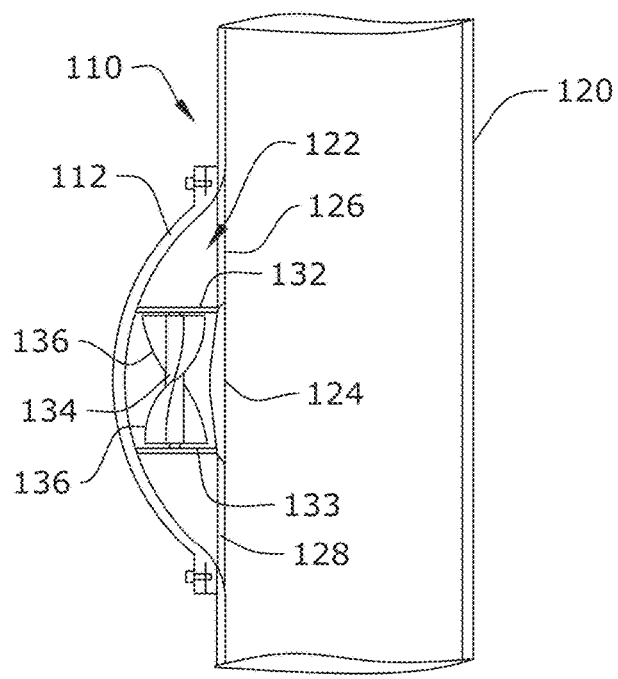
FIG. 7 shows a schematic view of one embodiment of the present invention.

FIG. 7 shows flow measuring system 110 is attached to riser 120. Flow measuring system 110 further comprises housing 112. Riser 120 is mechanically coupled to deflector plate 124 which covers some of hole 122. Deflector plate 124 is directly attached to upper vertical louvers 126 and lower vertical louvers 128. Upper mounting bracket 132 and lower mounting bracket 133 are directly attached to housing 112 and deflector plate 124.

Rotating shaft 134 is rotatably coupled to upper mounting bracket 132 and lower mounting bracket 133. Rotating shaft 134 is directly attached to a plurality of helical blades 136. As rotating shaft 134 turns, sensors determines the speed at which rotating shaft 134 is turning as well as the direction that rotating shaft 134 is turning. This enables the processor to determine the speed and direction of flow.

Figure 8:
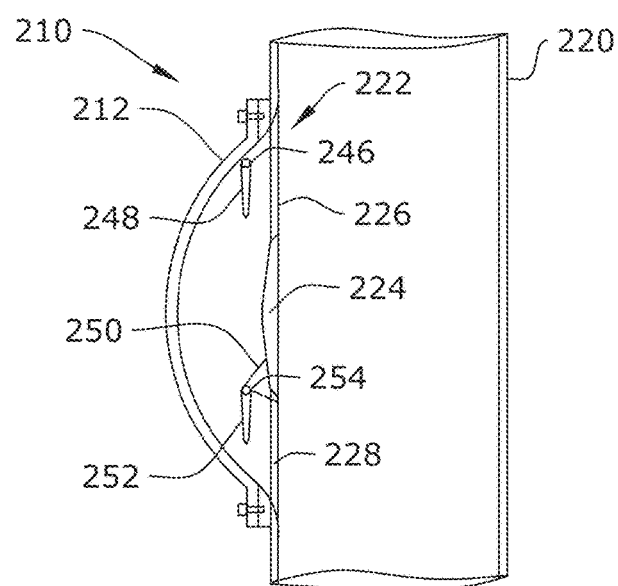
FIG. 8 shows a schematic view of one embodiment of the present invention.

FIG. 8 shows flow measuring system 210 is attached to riser 220. Flow measuring system 210 further comprises housing 212. Riser 220 is mechanically coupled to deflector plate 224 which covers some of hole 222. Deflector plate 224 is directly attached to upper vertical louvers 226 and lower vertical louvers 228. Upper flow plate 248 is directly attached to housing 212 via upper hinge 246. Deflector ramp 250 is attached to deflector plate 224. Lower flow plate 252 is attached to deflector ramp 250 via lower hinge 254. Flow into the housing 212 will cause the upper deflector plate 248, and lower deflector plate 252 to rotate in opposite directions and sensors attached to upper hinge shaft 246, and lower hinge shaft 254 will measure the angular position of the plates. Flow up the riser will deflect lower plate 252 inward and upper plate 248 outward toward riser 220. Flow down the riser will cause the opposite effect, upper plate 248 will move inward and lower plate 252 will move outward. The flow plate angles are signaled to the processor. The difference of a upper hinge angle and a lower hinge angle determine the speed and direction of the flow.

Figure 9:
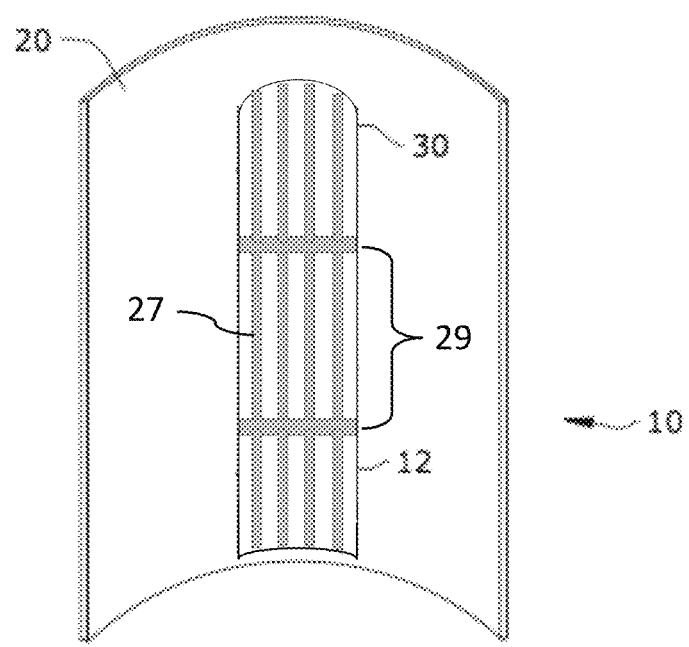
FIG. 9 depicts a schematic view of a disclosed embodiment.
Figure 10:
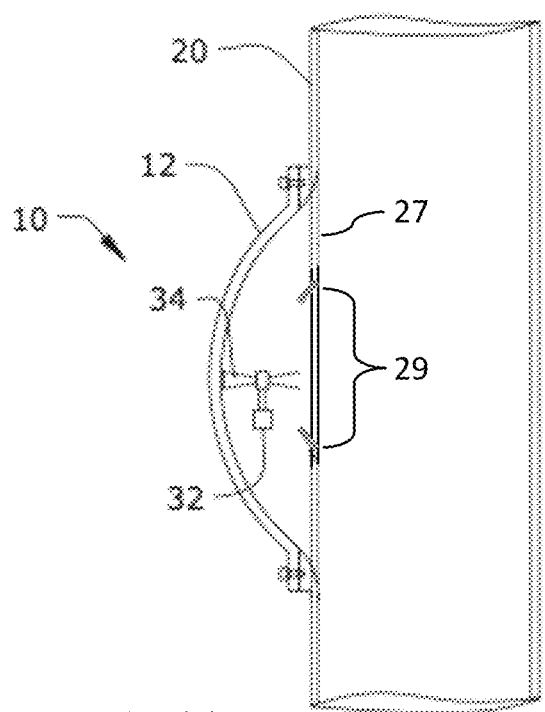
FIG. 10 depicts a schematic view of a disclosed embodiment.

FIGS. 9 and 10 depict continuous louvers 27 with director plates 29 disposed between louvers. More particularly, in FIGS. 9 and 10 the continuous louvers 27 span the entire length of riser aperture 22. Director plates 29, located between the louvers at the upper and lower portions of the louvers, divert or assist in directing fluid into and out of the module 12. While FIGS. 9 and 10 depict a single director plate at each end of the louvers, a plurality of director plates may be used.

The use of continuous louvers 27 presents an improvement over the known prior art, as there are fewer blockages in the fluid connection between the fluid in the riser and the fluid within the housing. The director plates, while relatively small in form, have been found to adequately direct the flow of fluid within the housing, vitiating the need for a deflector ramp or deflector plate. Not using a deflector ramp or deflector plate allows for greater fluid communication between the housing and the riser, which increases the correlation between flow rates in the riser and flow rates in the housing. Thus, the measurements of flow within the housing are of greater value in knowing the flow rates within the riser.

The use of continuous louvers provides mechanical advantages of filtering debris from the housing, which allows for sensors placed within the housing, such as propellers. Moreover, the continuous louvers while providing physical protection for interior sensors, still provide greater fluid commination between the riser and housing as compared to the prior art.

Figure 11:
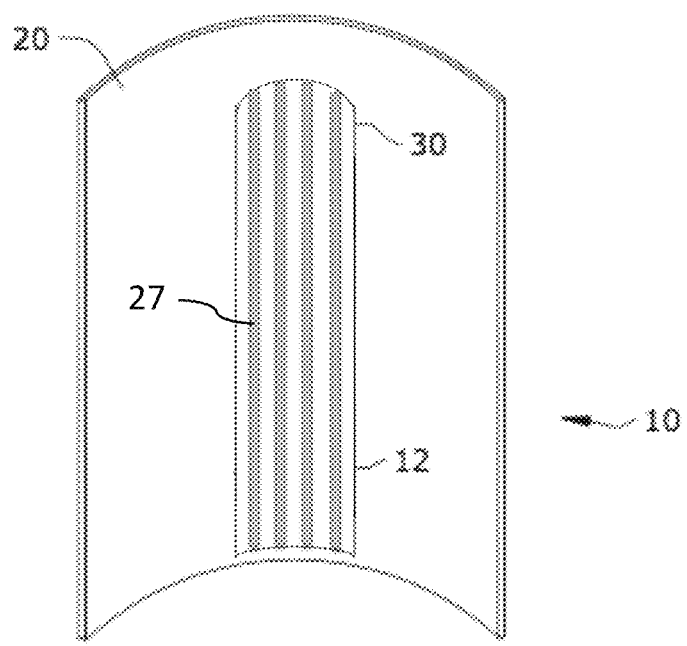
FIG. 11 depicts a schematic view of a disclosed embodiment.
Figure 12:
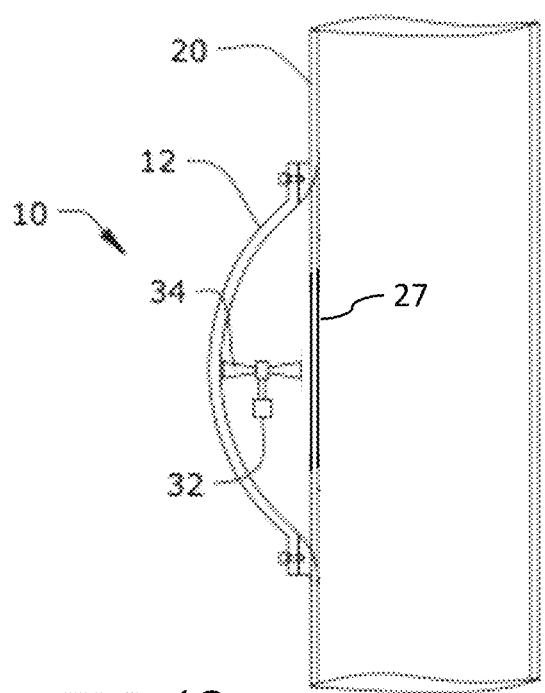
FIG. 12 depicts a schematic view of a disclosed embodiment.

FIGS. 11 and 12 depict continuous louvers 27 spanning the entire length of the riser aperture 22 with no director plates. Not using director plates increases the fluid connection between the fluid in the riser and the fluid within the housing. The absence of director plates has been found to provide mechanical advantages in fluid flow that were unexpected, in that interior sensors are protected while maintaining excellent fluid communication between the riser and housing. The continuous span of the continuous louvers provides an efficiency of manufacture and fluid performance that exceeds the two or three part louver/void covering systems of FIGS. 1-8.

Figure 13:
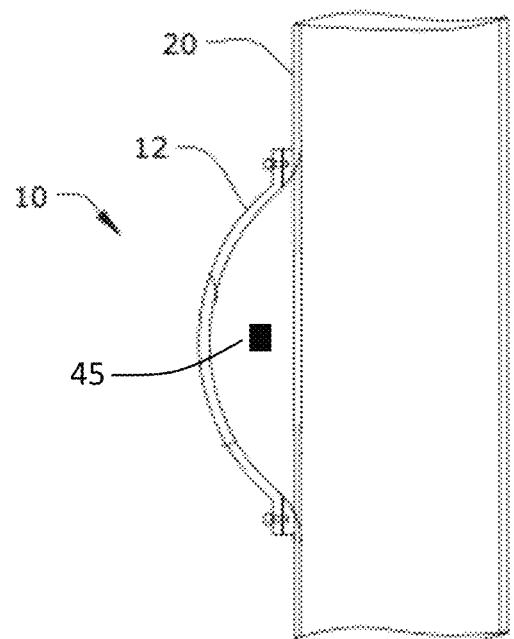
FIG. 13 depicts a schematic view of a disclosed embodiment devoid of louvers, direction plates and deflector plates.
Figure 14:
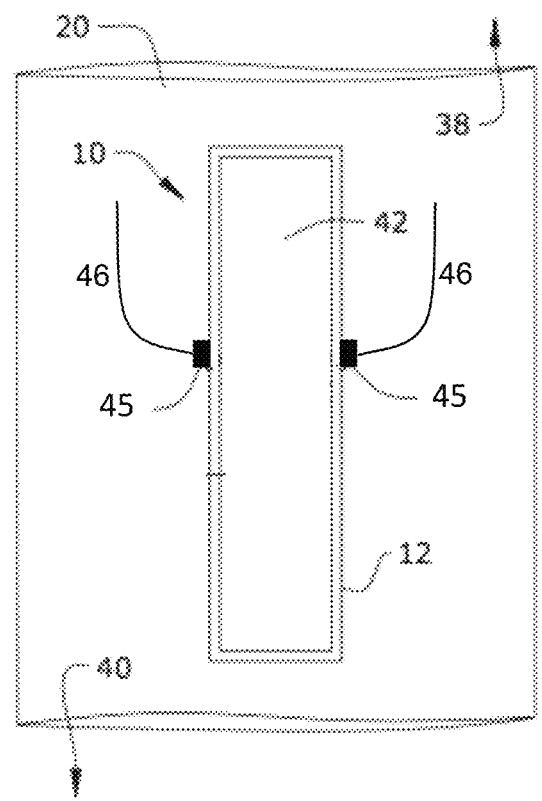
FIG. 14 depicts a schematic view of a disclosed embodiment devoid of louvers, direction plates and deflector plates.

FIGS. 13 and 14 depict a riser void, devoid of louvers or other obstructions with flow measurement sensors external to the chamber. More particularly, flow measurement may be accomplished by sensors 45 mounted upon the outside of the housing. In a disclosed embodiment, at least one sensor 45 is directly attached to the outside of the housing 12, while two sensors 45 are depicted in FIG. 14, a larger plurality of sensors may be used. Each sensor 45 may be electrically coupled to at least one sensor cable 46 which may be further electrically coupled to a processor, most commonly located on the surface 38. The sensors, in combination with the processors, can determine the speed and direction of fluid flow. As mentioned previously, the use of bare void defined within the riser, with direct fluid commination between the riser and housing, provides unexpectedly excellent results in housing fluid measurements matching the actual fluid flow within the riser.

As used in this application, the term "a" or "an" means "at least one" or "one or more."

All references throughout this application, for example patent documents including issued or granted patents or equivalents, patent application publications, and nonpatent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A flow monitoring system that detects the direction and volume of fluid flow in an offshore drilling marine riser; the flow monitoring system comprising:
    a) an arc shaped housing with the housing attached over an opening defined within the offshore drilling marine riser;
    b) a cavity defined within the arc of the housing and in fluid communication with the opening in the offshore drilling marine riser; and
    c) a sensor attached to the housing, the sensor configured to determine the direction and volume of fluid flow through the cavity of the housing.

2. The flow measuring system of claim 1 further comprising louvers spanning the opening defined within the offshore drilling marine riser.

3. The flow measuring system of claim 2 wherein one or more director plates are disposed between the louvers.

4. The flow measuring system of claim 2 further comprising a deflection plate disposed between the louvers and the housing.

5. The flow measuring system of claim 2 wherein the louvers comprise a set of continuous louvers.

6. The flow measuring system of claim 1 wherein the sensor comprises an ultrasonic sensor.

7. The flow measuring system of claim 1 wherein the sensor is disposed within the housing.

8. The flow measuring system of claim 1 wherein the sensor is mechanical and is disposed within the housing.

9. The flow measuring system of claim 8 wherein the sensor comprises a propeller disposed within the cavity of the arc of the housing.

10. The flow measuring system of claim 8 wherein the sensor comprises a helical screw shaft disposed within the cavity of the arc of the housing.

11. The flow measuring system of claim 1 wherein the housing comprises a semi-circular hydrodynamic profile to optimize fluid flow through the fluid pathway.

* * * * *